United States Patent
Lewis

(10) Patent No.: US 9,822,658 B2
(45) Date of Patent: Nov. 21, 2017

(54) GROOVED SEAL ARRANGEMENT FOR TURBINE ENGINE

(71) Applicant: United Technologies Corporation, Farmington, CT (US)

(72) Inventor: Scott D. Lewis, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/945,835

(22) Filed: Nov. 19, 2015

(65) Prior Publication Data

US 2017/0145848 A1    May 25, 2017

(51) Int. Cl.
| | |
|---|---|
| *F01D 5/14* | (2006.01) |
| *F01D 11/08* | (2006.01) |
| *F16J 15/16* | (2006.01) |
| *F01D 25/12* | (2006.01) |

(52) U.S. Cl.
CPC ............. *F01D 11/08* (2013.01); *F01D 25/12* (2013.01); *F16J 15/162* (2013.01); *F05D 2220/32* (2013.01); *F05D 2230/60* (2013.01); *F05D 2240/12* (2013.01); *F05D 2240/307* (2013.01)

(58) Field of Classification Search
CPC .... F01D 11/005; F01D 11/006; F01D 11/008; F01D 5/08; F16J 15/02
See application file for complete search history.

(56) References Cited

U.S. PATENT DOCUMENTS

| | | | |
|---|---|---|---|
| 3,411,794 A | * | 11/1968 | Allen .................... F01D 11/001 277/414 |
| 4,767,260 A | | 8/1988 | Clevenger et al. |
| 5,513,955 A | | 5/1996 | Barcza |
| 5,531,457 A | | 7/1996 | Tibbott et al. |
| 7,527,472 B2 | | 5/2009 | Allen |
| 8,201,834 B1 | | 6/2012 | Liang |
| 8,240,981 B2 | * | 8/2012 | Spangler ................. F01D 5/081 415/115 |
| 8,308,428 B2 | | 11/2012 | Bridges, Jr. et al. |
| 8,382,424 B1 | | 2/2013 | Liang |

(Continued)

FOREIGN PATENT DOCUMENTS

| | | |
|---|---|---|
| EP | 1452694 | 9/2004 |
| EP | 2055898 | 5/2009 |

(Continued)

OTHER PUBLICATIONS

European Search Report for European Patent Application No. 16199689 dated Mar. 21, 2017.

*Primary Examiner* — Gilbert Lee
(74) *Attorney, Agent, or Firm* — Carlson, Gaskey & Olds, P.C.

(57) ABSTRACT

A seal arrangement for a gas turbine engine according to an example of the present disclosure includes, among other things, a component including a body having a cold side surface adjacent to a mate face, and a seal member including a leading edge region and a trailing edge region spaced by sidewalls. The seal member defines one or more grooves. The one or more grooves abut the cold side surface to define one or more cooling passages, with at least one of the one or more cooling passages having a flared inlet defined by a corresponding one of the one or more grooves.

16 Claims, 5 Drawing Sheets

(56) References Cited

U.S. PATENT DOCUMENTS

| | | |
|---|---|---|
| 8,430,626 B1 | 4/2013 | Liang |
| 8,459,933 B1 * | 6/2013 | Liang .................... F01D 11/001 |
| | | 415/115 |
| 9,382,846 B2 * | 7/2016 | Milazar ................. F01D 11/005 |
| 9,394,915 B2 * | 7/2016 | Gordon ................. F04D 29/083 |
| 9,416,675 B2 * | 8/2016 | Lacy ..................... F01D 11/005 |
| 2009/0116953 A1 | 5/2009 | Spangler et al. |
| 2012/0189424 A1 | 7/2012 | Propheter-Hinckley et al. |

FOREIGN PATENT DOCUMENTS

| | | |
|---|---|---|
| WO | 2007/063128 | 6/2007 |
| WO | 2014138320 | 9/2014 |
| WO | 2015/026416 | 2/2015 |
| WO | 2015026416 | 2/2015 |
| WO | 2015/084449 | 6/2015 |

* cited by examiner

GROOVED SEAL ARRANGEMENT FOR TURBINE ENGINE

BACKGROUND

This disclosure relates to cooling for a component of a gas turbine engine, and more particularly to a seal having one or more grooves for cooling augmentation.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Adjacent blades or vanes are distributed to define leakage gaps at adjacent mate faces. Cooling airflow is communicated through the leakage gaps to cool surfaces adjacent to the mate faces.

SUMMARY

A seal arrangement for a gas turbine engine according to an example of the present disclosure includes a component including a body having a cold side surface adjacent to a mate face, and a seal member including a leading edge region and a trailing edge region spaced by sidewalls. The seal member defines one or more grooves. The one or more grooves abut the cold side surface to define one or more cooling passages, with at least one of the one or more cooling passages having a flared inlet defined by a corresponding one of the one or more grooves.

In a further embodiment of any of the foregoing embodiments, each of the one or more cooling passages has a flared inlet.

In a further embodiment of any of the foregoing embodiments, the flared inlet is located along one of the sidewalls or the leading edge region.

In a further embodiment of any of the foregoing embodiments, the seal member defines an axis extending between the leading edge and the trailing edge, and at least some of the grooves are transverse to the axis.

In a further embodiment of any of the foregoing embodiments, at least some of the one or more grooves includes a second end adjacent to the mate face. The second end is opposite to a first end defining the corresponding flared inlet.

In a further embodiment of any of the foregoing embodiments, the second end of at least some of the grooves are spaced from each of the sidewalls.

In a further embodiment of any of the foregoing embodiments, the cold side surface is located at a slot extending inwardly from the mate face, and the slot is configured to receive the seal member.

In a further embodiment of any of the foregoing embodiments, at least some of the one or more grooves have a curved profile.

In a further embodiment of any of the foregoing embodiments, the component is an airfoil. The airfoil includes an airfoil section extending from a platform, and the first cold side surface is located at the platform.

A gas turbine engine according to an example of the present disclosure includes a first component and a second component arranged about an axis. The first component includes a first cold side surface adjacent to a first mate face. The second component includes a second cold side surface adjacent to a second mate face. The first and second mate faces are arranged to define a leakage gap. A seal member defines a plurality of grooves adjacent to the leakage gap. The plurality of grooves abut the first and second cold side surfaces to define a plurality of cooling passages in communication with the leakage gap. One or more of the plurality of cooling passages has a flared inlet and an outlet adjacent to the leakage gap.

In a further embodiment of any of the foregoing embodiments, the first cold side surface is located at a slot extending inwardly from the first mate face, and the slot is configured to receive the seal member.

In a further embodiment of any of the foregoing embodiments, the seal member includes a leading edge region and a trailing edge region spaced by sidewalls, and the outlet of at least some of the plurality of cooling passages are spaced apart from the sidewalls.

In a further embodiment of any of the foregoing embodiments, the seal member is moveable between a first position and a second position relative to the first component, and the outlet of at least some of the plurality of cooling passages are spaced from the sidewalls when the seal member is in the first and second positions.

In a further embodiment of any of the foregoing embodiments, the flared inlet of one or more of the plurality of passages are spaced from the sidewalls.

In a further embodiment of any of the foregoing embodiments, one or more of the plurality of grooves are transverse to the leakage gap.

In a further embodiment of any of the foregoing embodiments, each of the first and second components is one of an airfoil and a blade outer air seal (BOAS).

In a further embodiment of any of the foregoing embodiments, the first components is an airfoil. The airfoil includes an airfoil section extending from a platform. The platform includes an upper surface bounding a core flow path and an undersurface bounding a cooling cavity, and the first cold side surface is located at the undersurface of the platform.

A method of sealing between adjacent components of a gas turbine engine according to an example of the present disclosure includes providing a feather seal defining one or more grooves, and positioning the feather seal across a leakage gap defined between mate faces of adjacent components such that the one or more grooves define cooling passages. One or more of the cooling passages has a flared inlet, and the one or more grooves are transverse to a projection of at least one of the mate faces.

In a further embodiment of any of the foregoing embodiments, the method includes communicating coolant through the cooling passages in response to relative movement of the feather seal and at least one of the mate faces wherein an end of one of the grooves opposite the corresponding flared inlet is spaced between sidewalls of the feather seal.

In a further embodiment of any of the foregoing embodiments, the flared inlet is located along a leading edge region of the feather seal.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
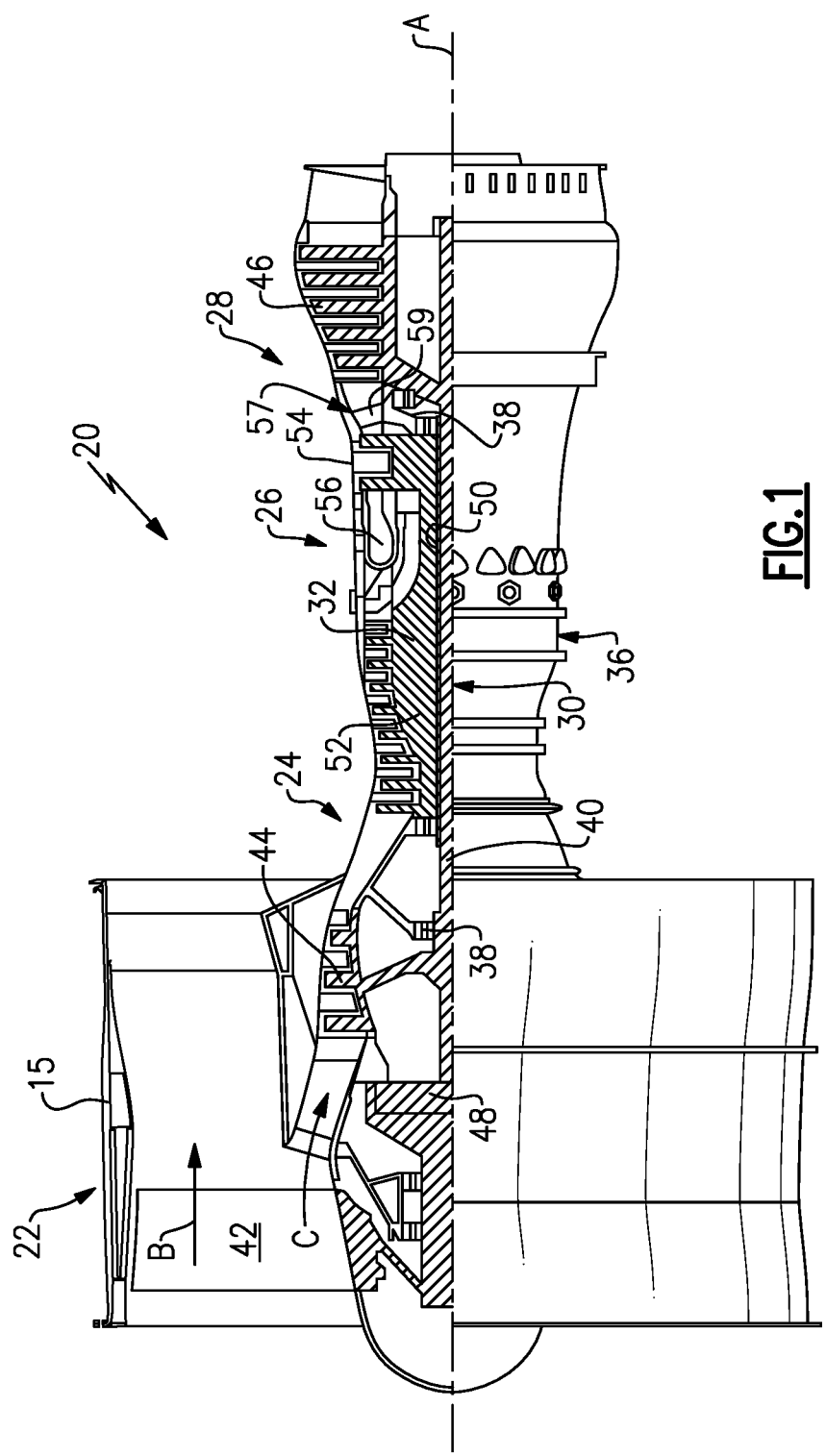
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
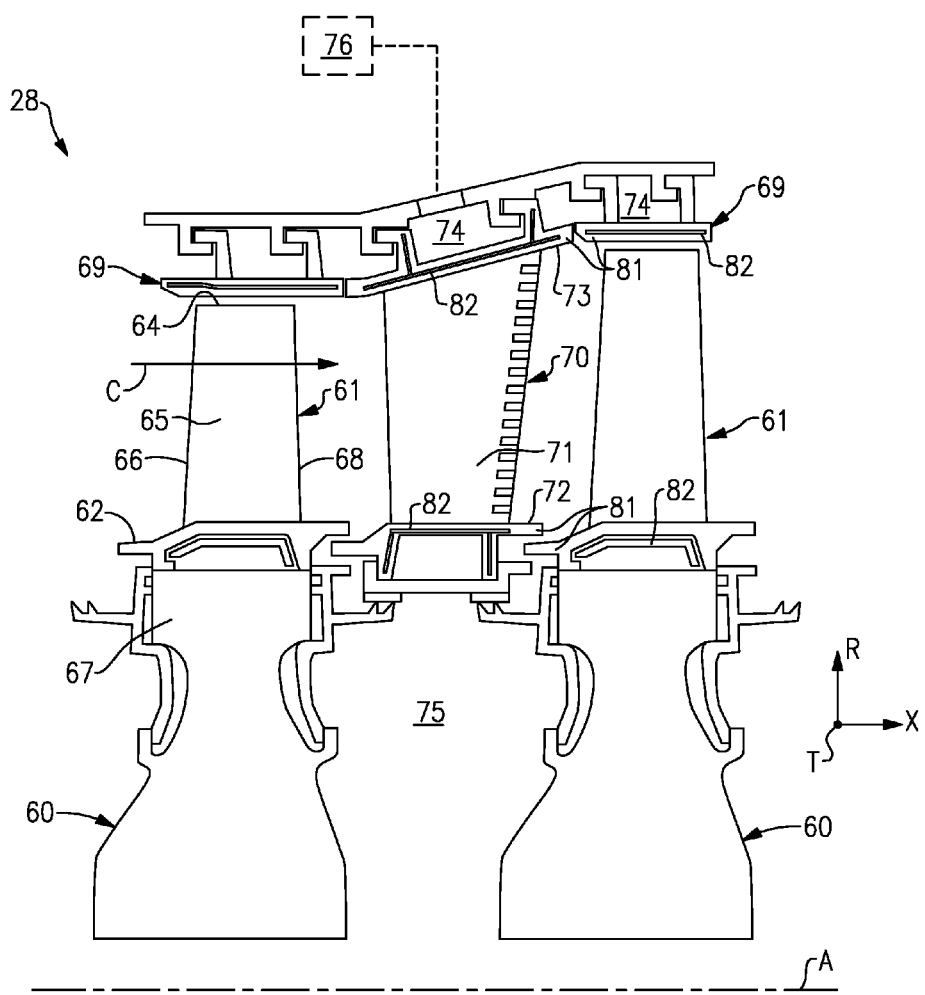
FIG. 2 schematically shows an airfoil arrangement for a turbine section.

FIG. 2 shows selected portions of the turbine section 28 including a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise direction X between a leading edge 66 and a trailing edge 68. A root section 67 of the airfoil 61 is mounted to the rotor 60, for example. It should be understood that the airfoil 61 can alternatively be integrally formed with the rotor 60, which is sometimes referred to as an integrally bladed rotor (IBR). A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes multiple airfoils 61, vanes 70, and BOAS 69 arranged circumferentially about the engine axis A.

The outer platform 73 of vane 70 and BOAS 69 can define one or more outer cooling cavities 74. The platform 62 of airfoil 61 and the inner platform 72 of vane 70 can define one or more inner cooling cavities 75. The cooling cavities 74, 75 are configured to receive cooling flow from one or more cooling sources 76 to cool portions of the airfoil 61, BOAS 69 and/or vane 70. Cooling sources 76 can include bleed air from an upstream stage of the compressor section 24 (shown in FIG. 1), bypass air, or a secondary cooling system aboard the aircraft, for example. Each of the cooling cavities 74, 75 can extend circumferentially in a thickness direction T between adjacent airfoils 61, BOAS 69 and/or vanes 70, for example.

The airfoils 61, vanes 70 and/or BOAS 69 can include one or more seal members 82 to bound the core flow path C, or otherwise reduce fluid communication between the cooling cavities 74, 75 and the core flow path C. In the illustrated example, the seal members 82 are arranged adjacent to mate faces 81 of the airfoils 61, vanes 70 and/or BOAS 69.

FIGS. 3 and 4A to 4C illustrate an exemplary sealing arrangement 178 for adjacent components. Although the exemplary sealing arrangements discussed herein primarily refer to a turbine blade, the teachings herein can also be utilized for another portion of the engine 20, such as BOAS 69, vane 70, an upstream stage of the compressor section 24, or combustor panels located in the combustor section 26 and defining portions of a combustion chamber, exhaust nozzles, or augmentors, for example. The exemplary cooling arrangements discussed herein can also be utilized adjacent to the cooling cavities 74, 75 and at various positions relative to the core flow path C, for example.

Airfoil 161 (FIG. 3) includes a cold side surface 180 adjacent to mate face 181. The cold side surface 180 is located on an undersurface of the platform 162. A seal member 182 abuts the cold side surface 180 of the platform 162 to bound the cooling cavity 75 (FIG. 2). In the illustrated example, the cold side surface 180 is located at a slot 183 extending inwardly from the mate face 181. The seal member 182 is received in the slot 183, which is dimensioned to limit relative movement of the seal member 182. The airfoil 161 may be provided with a support member 190 extending from root section 167 to define a radially inward portion of the slot 183.

The seal member 182 can be fabricated from sheet metal made of nickel or cobalt, for example. Other materials for the seal member 182 can be utilized, including various high temperature Ni, Cobalt, or Inco alloys, or composite materials, for example. In the illustrated example, the seal member 182 is a feature seal configured to at least partially seal cooling cavity 75 (FIG. 2) from the core flow path C, and is also configured to dampen vibrations of airfoil 161 that may occur during operation of the engine 20. The localized cooling techniques described herein reduce a likelihood of creep of the seal member 182 caused by excessive heat exposure, thereby reducing a likelihood of degradation in the dampening characteristics of the seal member 182.

The seal member 182 includes a leading edge region 187, a trailing edge region 188, and one or more sidewalls 189. The leading edge region, 187, trailing edge region 188, and/or sidewalls 189 can be substantially planar, curved, or have another suitable geometry corresponding to adjacent surfaces of the airfoil 161.

The seal member 182 defines an axis B (FIG. 4A) between the leading and trailing edge regions 187, 188. In the illustrated example, the axis B extends in a direction substantially parallel to chordwise direction X. In another example, the axis B is substantially perpendicular to the thickness direct T or the direction of rotation of the airfoil 161. In some examples, the axis B is substantially parallel to the engine axis A (FIG. 1).

Figure 3:
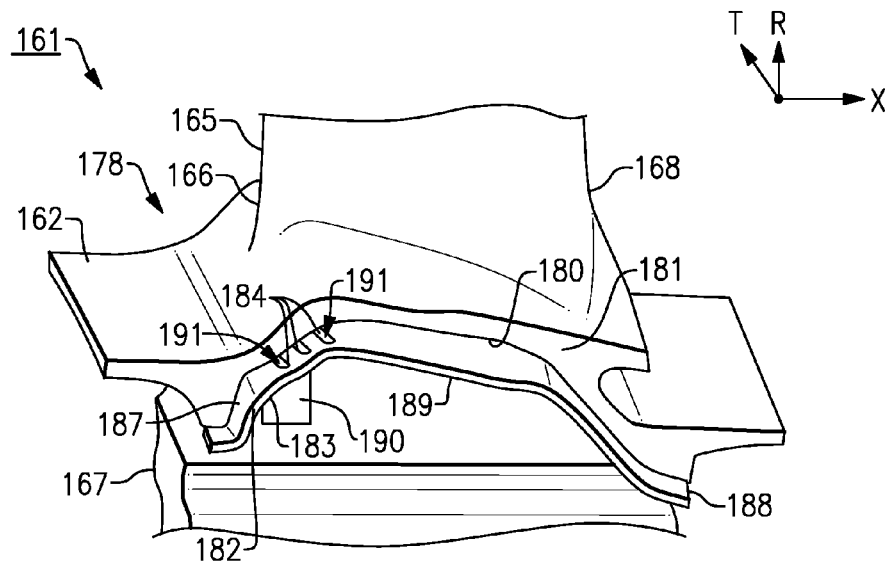
FIG. 3 illustrates a side view of a first embodiment of a cooling arrangement for an airfoil.
Figure 4A:
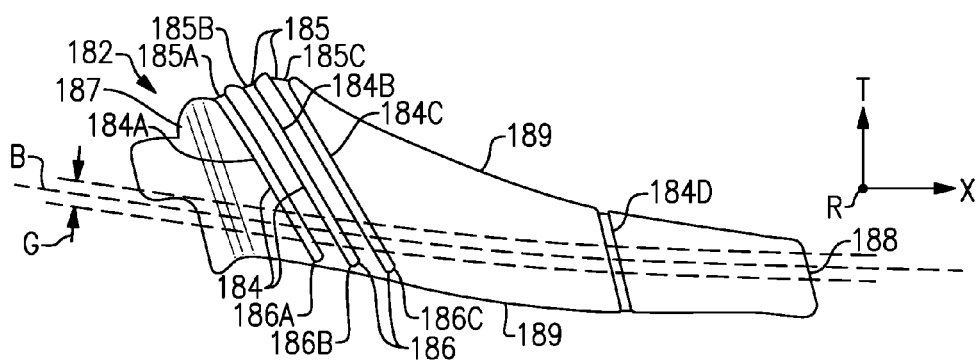
FIG. 4A illustrates a plan view of a seal member that can be utilized in the arrangement of FIG. 3.
Figure 4B:
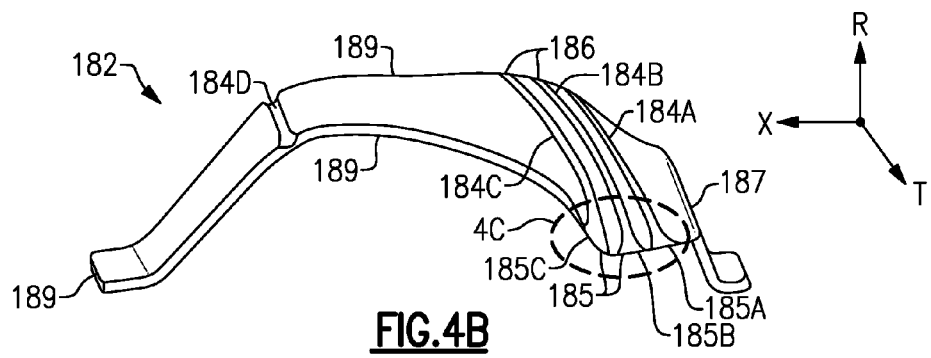
FIG. 4B illustrates a side view of the seal member of FIG. 4A.

The seal member 182 defines one or more grooves 184 in a thickness of the seal member 182. The grooves 184 can be stamped, machined, or cast into the seal member 182, for example. In another example, the seal member 182 and grooves 184 are formed by additive manufacturing. As illustrated in FIG. 3, the grooves 184 are arranged to abut the cold side surface 180 to define a plurality of cooling passages 191. Each of the grooves 184 extends between a first end 185 and a second end 186 (FIGS. 4A-4B). The grooves 184 are situated relative to the cold side surface 180 and coolant source 76 (FIG. 2) to establish a flow through the corresponding cooling passages 191. Each first end 185 is arranged relative to the cooling flow to define an inlet of the corresponding passage 191. In some examples, the second end 186 corresponds to an outlet of the corresponding passage 191, the inlet corresponding to the first end 185 being upstream of the second end 186, for example. In other examples, the second end 186 is arranged relative to the cooling flow to define an addition or second inlet of the corresponding passage 191.

Figure 6:
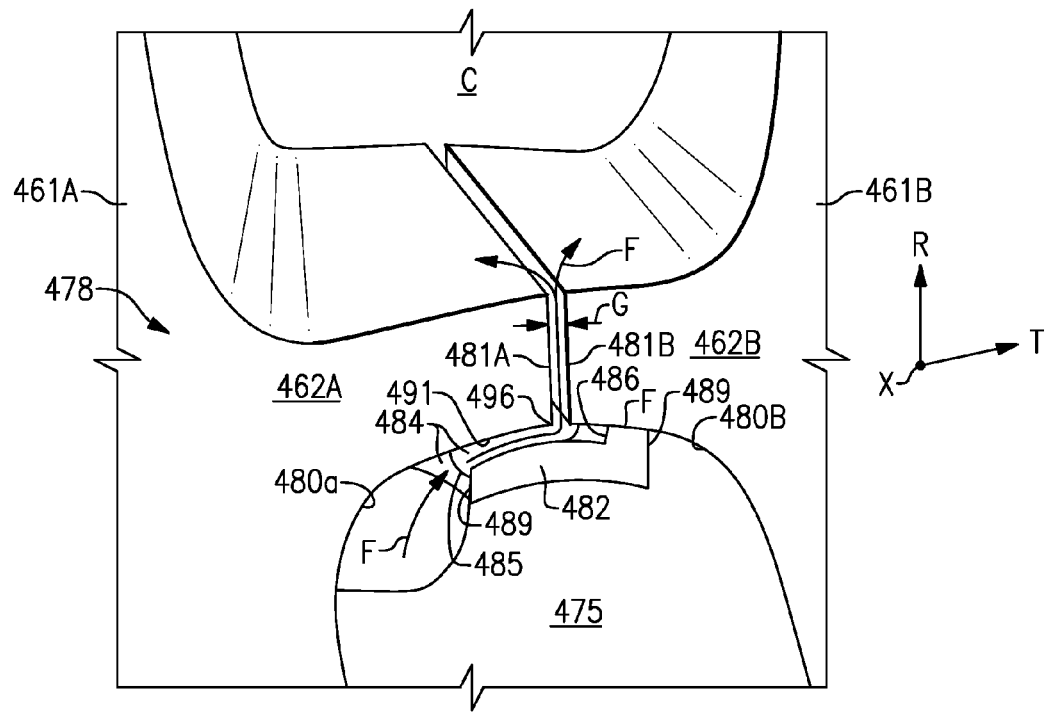
FIG. 6 illustrates a cross-sectional view of a seal member and adjacent airfoils according to an embodiment.

The grooves 184 are situated relative to mate face 181 such that the cooling passages 191 eject coolant into a leakage gap G (shown schematically in FIG. 4A and in FIG. 6). One or more of the grooves 184 can be oriented transverse to the axis B and/or a projection of at least one of the mate faces, such as grooves 184A-184C. As seen in FIG. 4A, the grooves 184A-184C can be aimed in an aft direction relative to axis B, or otherwise angled relative to the chordwise direction X, to target a localized area of leakage gap G to achieve a lower dump pressure. This arrangement can be utilized to ensure adequate backflow margin in the passages 191 and the leakage gap G, thereby reducing a likelihood of ingestion of hot combustion gases in the core flow path C through the leakage gap G. The transverse orientation also increases a length of the grooves 184A-184C, thereby increasing convective cooling provided to adjacent portions of the cold side surface 180 and seal member 182. The localized cooling techniques described herein can utilize secondary leakage air from the coolant source 76 (FIG. 2), which has a lower performance loss than dedicated cooling air that may be communicated to the airfoil 162, for example. Accordingly, the localized cooling techniques described herein can be utilized to reduce the overall cooling air demand and improve overall engine efficiency. The seal member 182 can define one or more grooves 184 substantially perpendicular to the axis B, such as groove 184D.

Figure 4C:
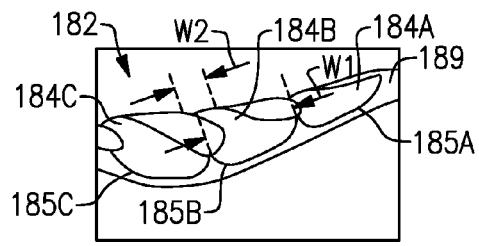
FIG. 4C illustrates selected portions of the seal member of FIG. 4B.

The first ends 185A-185C and corresponding inlets of the passages 191 are defined along at least one of the sidewalls 189 corresponding to the pressure and/or suction sides of the airfoil section 165. The first ends 185 of one or more of the grooves 184 taper inwardly to define a flared inlet, as illustrated by first ends 185A-185C. The first ends 185A-185C define a width $W_1$ that is greater than a minimum width $W_2$ of the groove 184 (FIG. 4C). In some examples, a ratio of the width $W_1$ to the width $W_2$ is greater than or equal to about 1.2:1. In other examples, the ratio is between about 1.2:1 and about 3:1. For the purposes of this disclosure, the term "about" means±3 percent of the given value, unless otherwise indicated. Additionally, edges of the first ends 185A-185C can be defined with a suitable contouring, such as round or bevel, to reduce flow instability adjacent to the flared inlets, for example.

The second ends 186A-186C are situated relative to the sidewalls 189 such that the outlets of the corresponding cooling passages 191 eject coolant into the leakage gap G. The second ends 186A-186C are separated from the first ends 185A-185C in the chordwise direction X such that corresponding outlets of the passages 191 are established adjacent to the mate face 181. The second ends 186A-186C are spaced from the sidewalls 189 such that a single outlet is defined adjacent to mate face 181 for each of the corresponding passages 191. One or more of the second ends 186 can be arranged relative to the first ends 185 such that the second ends 186 define a second inlet to the corresponding passages 191, as depicted by groove 184D, for example. The arrangement of multiple inlets for a single passage 191 can be utilized to reduce plugging caused by debris or other particulates carried in the secondary leakage air communicated from the coolant source 76 (FIG. 2), for example.

Figure 5A:
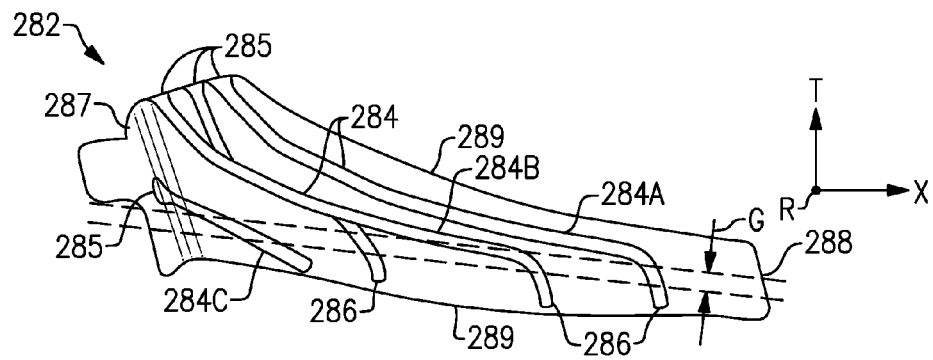
FIG. 5A illustrates a plan view of a second embodiment of a seal member.

In the illustrated example of FIGS. 4A to 4C, a projection of each of the grooves 184A-184D onto a plane defined by axis T, X is substantially linear, and a projection of each of the grooves 184A-184C onto a plane defined by axis R, X is curved. In the illustrated example of FIG. 5A, at least some of the grooves 284A-284B can have a curved profile relative to the R, X plane. One or more of the grooves 284C (one depicted) can include a first end 285 defining a flared inlet along a leading edge region 287 of seal member 282. At least some of the grooves 284 can have two or more first ends 285 and/or two or more second ends 286, as illustrated by groove 284B, such that the corresponding cooling passage branches into two or more passage sections to provide cooling augmentation to localized portions of the airfoil 161 (FIG. 3) and/or seal member 282.

Figure 5B:
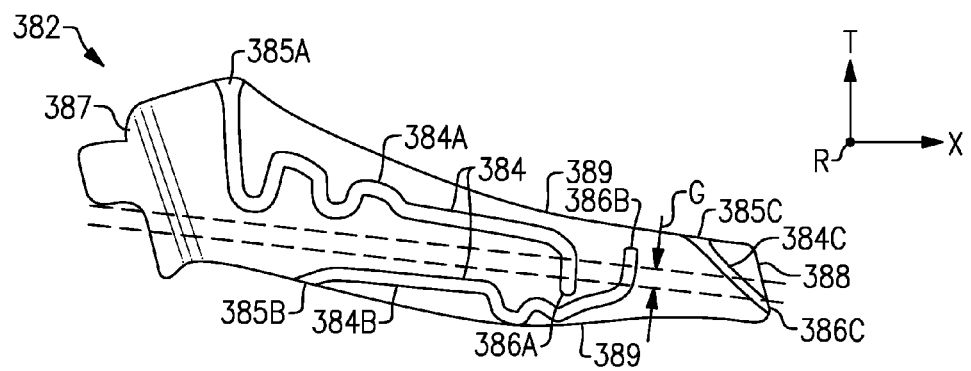
FIG. 5B illustrates a plan view of a third embodiment of a seal member.

In the illustrated example of FIG. 5B, at least some of the grooves can have a complex geometry, such as a circuitous or serpentine profile shown by grooves 384A-384B. The first ends 385A-385B are located on two or more sidewalls 389 of seal member 382 and second ends 386A-386B are located on opposite sides of leakage gap G. One or more of the second ends and corresponding outlets of the cooling passages can be located along the trailing edge region, illustrated by second end 386C of groove 384C.

Referring to FIG. 6, a method of sealing utilizing the sealing arrangements discussed herein is described as follows. Mate faces 481A, 481B of airfoils 461A, 461B are arranged adjacent to each other to define leakage gap G adjacent to core flow path C. Seal member 482 is arranged adjacent to cold side surfaces 480A, 480B to reduce flow between, or otherwise separate, cavity 475 and the core flow path C. The cavity 475 is provided with secondary cooling air, for example.

One or more grooves 484 (one shown for illustrative purposes) are arranged adjacent to the cold side surfaces 480A, 480B to establish a flow path for fluid F through corresponding cooling passage 491. First end 485 of groove 484 tapers inwardly from sidewall 489 to define a flared inlet 494 of the cooling passage 491. Fluid F is communicated to the inlet and through the passage 491 to provide convective cooling to adjacent portions of cold side surface 480A and seal member 482. Thereafter, the relative warm fluid F is ejected from outlet 496 of the passage 491 into the leakage gap G. It should be appreciated that the tapered geometry of the flared inlet reduces a relative pressure with respect to the fluid F such that a velocity of the fluid F may be insufficient to carry debris or particulates into the cooling passage 491. This arrangement reduces a likelihood of pressure loss at the inlet caused by blockage by such debris or particulates, thereby improving the cooling characteristics and durability of the seal arrangement 478.

During operation of the engine 20 (FIG. 1), the seal member 482 may move relative to the mate faces 481A, 481B between a first position and a second position, such as in the circumferential or thickness direction T. The second end 486 can be situated between a projection of the mate face 481B and the adjacent sidewall 489 such that the outlet is spaced from each of the sidewalls 489 when in the first and second positions to reduce a likelihood of blockage of the outlets. The second end 486 can also be situated to account for relative movement in the axial or chordwise direction X, for example.

Figure 7:
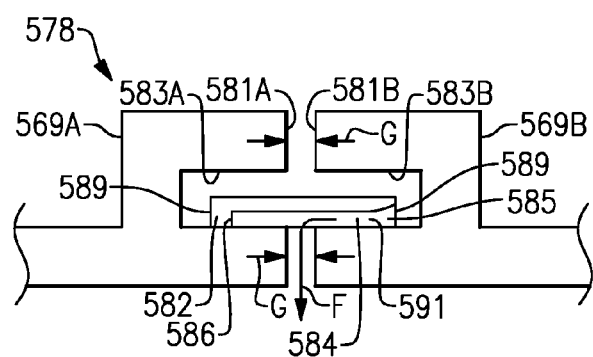
FIG. 7 illustrates a cross-sectional view of a seal member and adjacent components according to another embodiment.

FIG. 7 illustrates a cooling arrangement 578 for adjacent components according to another example. In the illustrated example, the adjacent components are BOAS 569A, 569B. Mate faces 581A, 581B of BOAS 569A, 569B are situated adjacent to each other define leakage gap G. Seal member 582 is arranged within slots 583A, 583B of BOAS 569A, 569B to restrict flow through the gap G. The seal member 582 includes one or more grooves 584 to define corresponding cooling passages 591 (one shown), according to any of the arrangements discussed herein.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal arrangement for a gas turbine engine, comprising:
   a component arranged about an axis and including a body having a cold side surface adjacent to a mate face;
   a seal member including a leading edge region and a trailing edge region spaced by sidewalls, the seal member defining one or more grooves, a length of the one or more grooves abutting the cold side surface to define one or more cooling passages, with at least one of the one or more cooling passages having a flared inlet defined by a corresponding one of the one or more grooves;

wherein the component is an airfoil, the airfoil including an airfoil section extending from a platform, the platform including an upper surface bounding a core flow path and an undersurface bounding a cooling cavity, and the first cold side surface is located at the undersurface of the platform;

wherein the airfoil is a turbine blade; and wherein the flared inlet is forward of an outlet of a corresponding one of the plurality of cooling passages relative to the axis, and the flared inlet is spaced apart from the mate face.

2. The seal arrangement as recited in claim 1, wherein each of the one or more cooling passages has a flared inlet.

3. The seal arrangement as recited in claim 1, wherein the flared inlet is located along one of the sidewalls or the leading edge region.

4. The seal arrangement as recited in claim 1, wherein the seal member defines an axis extending between the leading edge and the trailing edge, and at least some of the grooves are transverse to the axis.

5. The seal arrangement as recited in claim 1, wherein at least some of the one or more grooves includes a second end adjacent to the mate face, the second end opposite to a first end defining the corresponding flared inlet.

6. The seal arrangement as recited in claim 5, wherein the second end of at least some of the grooves are spaced from each of the sidewalls.

7. The seal arrangement as recited in claim 1, wherein the cold side surface is located at a slot extending inwardly from the mate face, and the slot is configured to receive the seal member.

8. The seal arrangement as recited in claim 1, wherein at least some of the one or more grooves have a curved profile.

9. A gas turbine engine, comprising:

a first component and a second component arranged about an axis, the first component including a first cold side surface adjacent to a first mate face, the second component including a second cold side surface adjacent to a second mate face, the first and second mate faces arranged to define a leakage gap;

a seal member defining a plurality of grooves adjacent to the leakage gap, a length of each of the plurality of grooves abutting the first and second cold side surfaces to define a plurality of cooling passages in communication with the leakage gap, one or more of the plurality of cooling passages having a flared inlet and an outlet adjacent to the leakage gap;

wherein each of the first and second components is one of an airfoil and a blade outer air seal (BOAS);

wherein the first component is an airfoil, the airfoil including an airfoil section extending from a platform, the platform including an upper surface bounding a core flow path and an undersurface bounding a cooling cavity, and the first cold side surface is located at the undersurface of the platform;

wherein the airfoil is a turbine blade; and wherein the flared inlet is forward of an outlet of a corresponding one or more of the plurality of cooling passages relative to the axis, and the flared inlet is spaced apart from each of the first and second mate faces.

10. The gas turbine engine as recited in claim 9, wherein the first cold side surface is located at a slot extending inwardly from the first mate face, and the slot is configured to receive the seal member.

11. The gas turbine engine as recited in claim 9, wherein the seal member includes a leading edge region and a trailing edge region spaced by sidewalls, and the outlet of at least some of the plurality of cooling passages are spaced apart from the sidewalls.

12. The gas turbine engine as recited in claim 11, wherein the seal member is moveable between a first position and a second position relative to the first component, and the outlet of at least some of the plurality of cooling passages are spaced from the sidewalls when the seal member is in the first and second positions.

13. The gas turbine engine as recited in claim 11, wherein the flared inlet of one or more of the plurality of passages are spaced from the sidewalls.

14. The gas turbine engine as recited in claim 9, wherein one or more of the plurality of grooves are transverse to the leakage gap.

15. A method of sealing between adjacent components of a gas turbine engine, comprising:

providing a feather seal defining one or more grooves;

positioning the feather seal across a leakage gap defined between mate faces of adjacent components such that the one or more grooves define cooling passages, one or more of the cooling passages having a flared inlet, and a length of the one or more grooves being transverse to and extending through a projection of at least one of the mate faces;

communicating coolant through the cooling passages in response to relative movement of the feather seal and at least one of the mate faces;

wherein an end of one of the grooves opposite the corresponding flared inlet is spaced between sidewalls of the feather seal; and wherein the step of positioning the feather seal includes the length of the plurality of grooves each extending a distance of the leakage gap.

16. The method as recited in claim 15, wherein the flared inlet is located along a leading edge region of the feather seal.

* * * * *